April 7, 1959  L. W. NICKOLS  2,880,513
GAUGING OF LINEAR DIMENSIONS
Filed Jan. 9, 1956  3 Sheets-Sheet 1

April 7, 1959 L. W. NICKOLS 2,880,513
GAUGING OF LINEAR DIMENSIONS
Filed Jan. 9, 1956 3 Sheets-Sheet 2
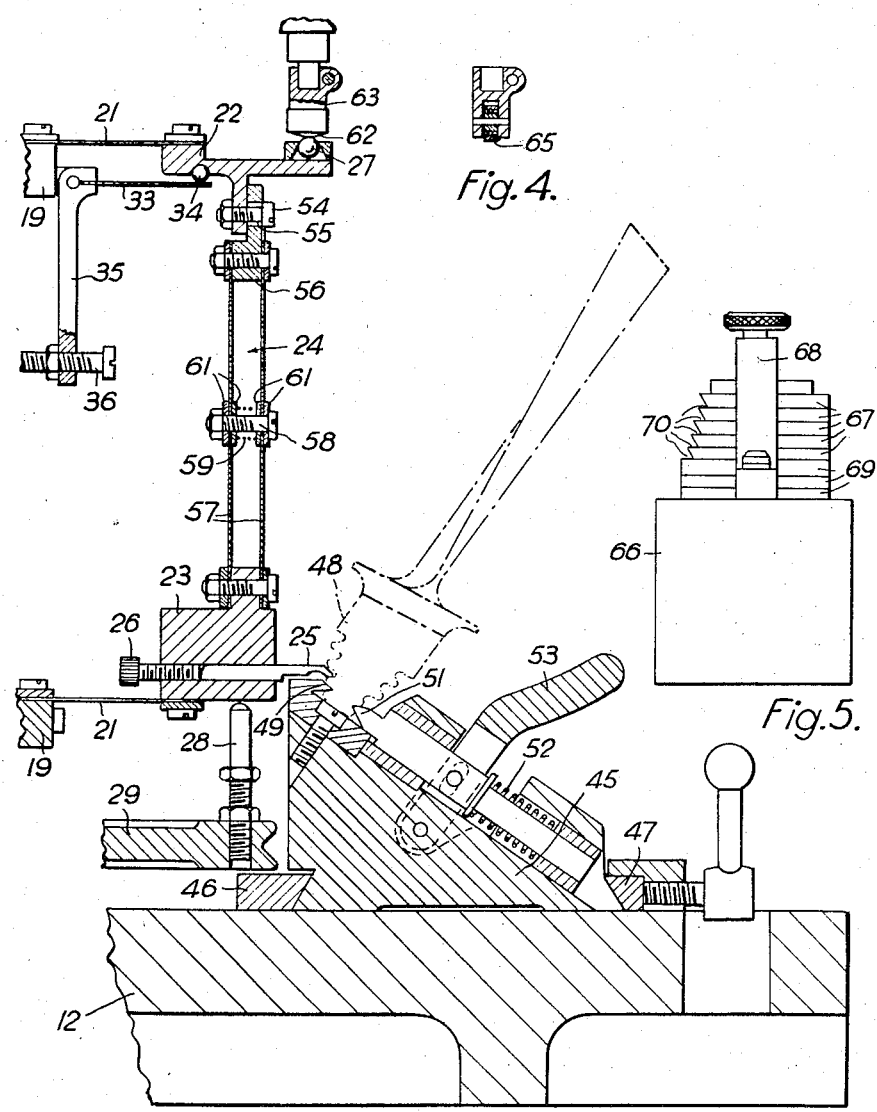

April 7, 1959  L. W. NICKOLS  2,880,513
GAUGING OF LINEAR DIMENSIONS
Filed Jan. 9, 1956  3 Sheets-Sheet 3

United States Patent Office

2,880,513
Patented Apr. 7, 1959

2,880,513

GAUGING OF LINEAR DIMENSIONS

Leonard Wilfred Nickols, Hampton Hill, England, assignor to Power Jets (Research and Development) Limited, London, England, a British company Application January 9, 1956, Serial No. 558,157

Claims priority, application Great Britain January 11, 1955

18 Claims. (Cl. 33—147)

This invention relates to the gauging of linear dimensions and an object is to provide a method and an apparatus which will enable a plurality of dimensions of a workpiece to be gauged in a rapid manner using a single indicating device for the several dimensions.

The method of the invention consists in holding an indicator and the workpiece in fixed relative position and then coupling the indicator in succession to the several surfaces of the workpiece to be gauged by a respective feeler system, the overall dimensions of which are such as to bring the indicator to a predetermined reading if the respective dimension is of the correct value.

Apparatus according to the invention comprises a feeler member for each dimension to be gauged, means for producing relative movement in a closed path between the feeler members and the workpiece whereby each feeler member in turn is carried into engagement with the corresponding surface of the workpiece, each feeler member being movable in a direction responsive to the dimension being gauged, at least one indicator held in constant relationship to the workpiece, and a respective transmission system connected with each feeler member which is of such construction and location that when the feeler member is in the gauging position it is coupled with the indicator and which is of such overall dimension that the indicator will show any departure of the workpiece from the desired value of the corresponding gauged dimension. Generally it will be more convenient for the workpiece and indicator to be stationary and the feeler member and transmission systems to move.

While it would be possible to carry the feeler members in a path which at the region of the workpiece brings each feeler member towards the workpiece in the direction in which the corresponding dimension is to be gauged, such a path involves a discontinuity and it is preferred therefore to let the path cross the direction in which the dimension is to be gauged. A convenient form of path is circular and except for small movements in the direction of gauging, is plane.

If one or more of the transmission systems includes a lever or levers, the apparatus can deal with dimensions in different directions, but it is particularly well adapted to the case in which all the dimensions to be gauged are in the same direction, in which case, each transmission system can be a single strut and the risk of lost motion can thus be minimized.

The movements of the feeler members may be guided by parallel spring strips, whereby backlash is avoided and so far as the transmission systems are single struts, the struts may carry the feeler members and themselves be guided by the spring strips.

The part of each feeler member which engages the workpiece may be rounded or similarly shaped to lead it on to the workpiece, in which case when not in engagement it must be checked, for example by an adjustable stop, at a position which enables this rounded or similarly shaped part to run on to the workpiece.

A plurality of workpiece stations and indicators may be provided, co-operating with the same set of feeler members, so that a plurality of workpieces can be tested in each cycle of operations.

The apparatus may be provided with motor drive which carries it through its operating cycle at a convenient speed and the speeds may be varied through the cycle so that the feeler members move rapidly when not in engagement with the workpiece but slow down when they are in engagement, to give the operator a longer time to make observations and to permit changing the workpiece in the workholder. If a plurality of indicators is provided and such speed variations are used, then the feeler members are desirably equally spaced round the circuit and the workpiece and indicator stations are at the same spacing.

If desired the apparatus may incorporate an indicator which records the gauged dimensions directly on a moving chart. Apparatus of this character having a head which can be substituted for a self-contained visual indicator is commercially available. With such automatic recording not only is a permanent record obtained, but the work of the operator is reduced to inserting and removing the workpieces and there is no risk of missing an indication.

The apparatus according to the invention is particularly adapted for measuring the spacing or pitch of the serrations on the roots of turbine blades, where very small dimensional tolerances are necessary. The pressure flanks of these serrations are at an angle to the axis of the blade and accordingly the blade is held with its axis at a corresponding angle to the direction of gauging movement of the feeler member, so that the surfaces to be gauged lie perpendicular to this direction of movement. Conveniently the datum for gauging is the pressure face of the lowest serration, that is, the serration farthest from the blade proper. A clamping device is provided by which the blade is held by engagement with this datum surface.

A convenient embodiment of the present invention for gauging turbine blade roots is illustrated by way of example, together with some detail modifications, in the accompanying drawings in which:

Fig. 3 is a detail section of Fig. 2 on an enlarged scale,

Fig. 4 is a detail of an alternative form of one feature of Fig. 3,

Fig. 5 shows a device for use in setting the apparatus,

Figure 1:
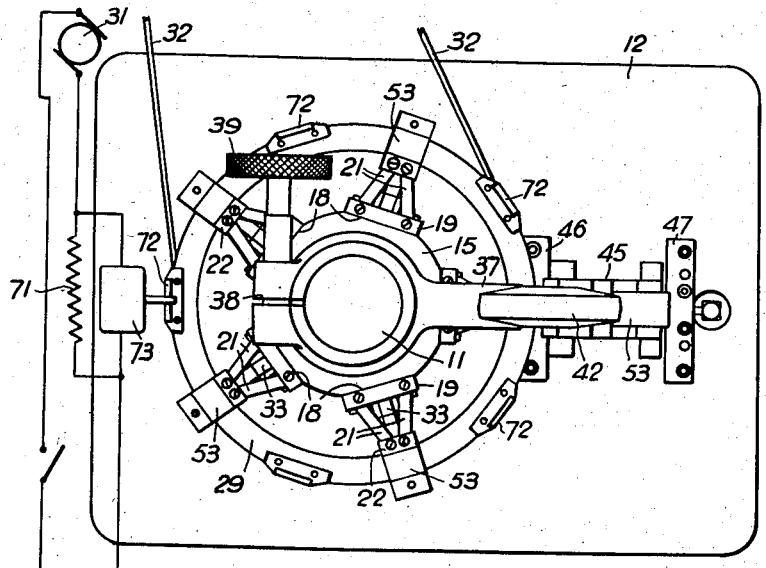
Fig. 1 is a plan view.

In the example illustrated a vertical pillar 11 is shouldered at its lower end to fit accurately in a baseplate 12, and is secured by a bolt 13. By means of plain bearing bushes 14, a cylinder 15 is journalled on the pillar and the weight of the cylinder and of the parts carried thereby is transmitted to the baseplate through a ball thrust bearing 16. Since this bearing provides a transverse location of the parts upon which the accuracy of gauging depends, the bearing itself should be accurate and it is desirable that the cylinder should be kept pressed downwardly. With the apparatus vertically arranged and of the proportions shown, the weight can be relied on, but for extra security a spring 17 may be provided which presses the cylinder downwardly. As many equally distributed flats 18 are machined on the cylinder as there are surfaces to be gauged, five in the illustrated example, and on each flat is secured near its upper end and near its lower end a respective bar 19 forming an anchorage for two strips 21 of spring steel. The two strips 21 are symmetrically arranged with respect to the radius but in V formation (see Fig. 1), with the apex outwards. At the apex of the corresponding upper and lower pairs of strips are secured respective brackets 22, 23, joined by a strut member, indicated generally by the numeral 24. At a suitable level in the lower bracket 23, a feeler member 25 is mounted in a transverse bore, the projection of which can be regulated by a set screw 26 engaging its inner end as can be seen in Fig. 3. The projecting end of the feeler member 25 is rounded to give it a lead on to the surface to be gauged and it is also bevelled on its upper surface to enable it to enter the groove in the workpiece. The contact face of the feeler member may be of hardened steel or it may be faced with a wear-resistant material such as tungsten carbide or stellite. The upper bracket 22 carries a suitable member such as a steel ball 27 which serves to actuate the indicator, as will be described later. The V strips 21 and strut 24 constitute a linkage which is freely movable vertically, but is very stiff in all transverse planes. To support this assembly when the feeler member 25 is not in contact with a workpiece, an adjustable vertical stop 28 is provided beneath the lower bracket 23 and this may conveniently be carried in a disc 29 secured to the cylinder 15. The disc 29 has a V section rim and constitutes a pulley whereby the cylinder can be rotated, for instance from a motor 31, by a belt 32. To support part of the weight, a leaf spring 33 may engage beneath a suitable surface such as that of a ball 34 on the upper bracket 22, this leaf spring being carried by a pivoted arm 35 having a screw 36 engaging the surface of the cylinder so that the spring pressure can be adjusted.

On the upper end of the pillar 11 a radial arm 37 is rotatable. It is provided with a split lug 38 and clamping screw 39. The outer end of the arm has a split lug 41 by which the neck of an indicator 42 of appropriate sensitivity can be clamped by a screw 43. Beneath the position of the indicator, a workholder 45 is slidable on the baseplate in an inverted V slide controlled by bars 46 and set so that the direction of movement of the workholder is tangential to the circular path described by the feeler members. A clamp 47 is provided to hold the workholder 45 fixed in the inverted V slide. The upper surface of the workholder is at an angle such that a blade root 48 to be gauged held with its axis perpendicular to that surface has the pressure surfaces of the serrations on the side facing the pillar horizontal. On this upper surface is secured the workpiece clamping device which comprises a pair of spaced, fixed bevelled anvils 49 on the pillar side which engage in the lowest serration of the blade root and a single movable anvil 51 which engages the lowest serration on the back of the blade root between the positions of the two fixed anvils, under the pressure of a spring 52. A lever 53 is provided linked to the anvil 51 so that the latter can be pressed back against the spring to enable the workpieces to be inserted and removed. The apices of the anvils 49, 51, are sufficiently rounded or truncated to prevent them from bottoming in the serrations.

It will be understood that the respective feeler members 25 in the several lower brackets 23 are set at positions corresponding to the several surfaces to be gauged. This enables all the strut members 24 and brackets 22, 23, to be made of nominally the same length. To provide for coarse adjustment the upper end of the strut may be secured to the upper bracket 22 by a screw 54 passing through a slot 55 in the upper end block 56 of the strut, while fine adjustment may be provided for by making the main part of each strut in the form of two thin steel strips 57 with a cross screw 58 at the centre whereby the two strips 57 can be bowed against the action of a compression spring 59. Such an adjustment is extremely sensitive, while providing a substantial range; for example, with strips 57 of about 2¼ inches (56 mm.) free lengths, a range of adjustment of 0.005 inch (0.127 mm.) can readily be provided with a sensitivity 0.00001 inch (0.00025 mm.). The ends of the two strips are rigidly secured at the block 56 and at the lower end directly to the lower bracket 23. The adjusting screw 58 at the centre may pass through stiffening plates 61 secured to the strips with epoxy resin.

To avoid wear on the indicator plunger, its end may be provided with a facing of wear resistant material such as tungsten carbide or stellite. Fig. 3 shows such a facing 62 on a separate fitting 63 clamped on the end of the indicator plunger. Alternatively, as shown in Fig. 4, a miniature ball bearing 65 may be mounted here to ride over the ball 27 carried by the upper bracket 22. This is not quite so accurate as a facing of wear resistant material, since there may be slight eccentricity of the inner and outer races of the ball bearing.

For the purpose of setting up the apparatus a fixture illustrated in Fig. 5 is provided comprising a block 66 on top of which a number of smaller blocks 67 are secured by a clamp 68, slip gauges 69 of appropriate dimensions being interposed between the large block and the smaller blocks. The upper and lower faces of all the blocks are lapped accurately flat and parallel. The height of the uppermost slip gauge 69 is made equal to that of the datum face of the blade roots to be gauged above the base of the workholder 45. The height of each of the upper smaller blocks 67 is made equal to the basic pitch, measured normal to the pressure flanks, of the root serrations on the blades. The smaller blocks have their leading edges relieved as at 70 and are assembled so that these leading edges are staggered. If the workholder 45 is replaced by the assembled setting fixture, the upper surfaces of the latter are at the same heights above the baseplate 12 as the pressure flanks of a perfect turbine blade root held in the workholder.

The cylinder 15 is rotated until the lowermost feeler member 25 is in the measuring position, in contact with the appropriate gauging face of the fixture and directly under the indicator 42. By means of the screw 54 and slot 55 in the upper block 56 the length of the strut assembly is adjusted until a reading is obtained on the indicator. Fine adjustment of the strut is then effected by the screw 58 to produce a zero reading. The vertical stop 28 beneath the lower bracket 23 is then adjusted until it is about 0.002 inch (0.05 mm.) below the lower block in the gauging position. The above procedure is repeated for the other feeler members.

For the actual gauging operation, the setting fixture is then replaced by the workholder 45 and a turbine blade inserted in the latter. The readings of the feeler member obtained on the indicator 42 as the turret constituted by the cylinder 15 and the parts carried thereby is rotated are the errors of spacing of the pressure flanks with reference to the lowermost pressure flank as a datum.

During gauging the turret is rotated from the motor 31 through the belt 32. A resistance 71 in circuit with the motor keeps the speed down while each feeler member is moving in engagement with the workpiece, but to speed up the movement between these times, cams 72 attached to the disc 29 engage the arm of a switch 73 which short-circuits the resistance. With this arrangement the angular intervals between the successive feeler members must be equal. When one complete circuit has been made, the workpiece is changed and the operation repeated. With a convenient speed of rotation the workpiece can easily be changed between the traverses of successive feeler members without the need to stop the motor. In the case of a turbine blade the serrations on one side only are gauged during one revolution of the turret. The serrations on the other side may be similarly gauged after reversing the workpiece in the workholder.

Figure 6:
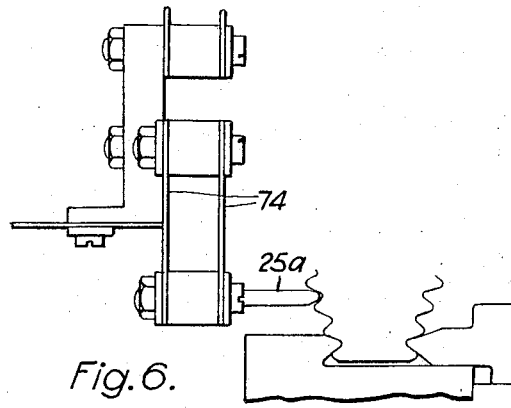
Fig. 6 is a detail side view on a still larger scale of an alternative arrangement.
Figure 7:
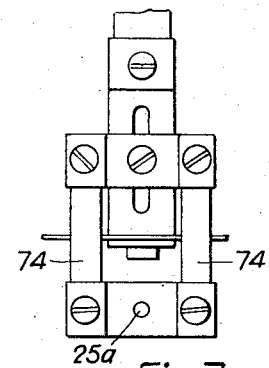
Fig. 7 is a front view of Fig. 6 with the workpiece and its holder removed.

In some cases it is desired to measure the serrations of turbine blade roots with reference to the centre of the lowermost serration. Figs. 6 and 7 show modifications which will enable this to be done. The blades must be held vertically but the same clamping device 49, 51, 52, 53, described above can still be used if the workholder is set horizontally. The lower bracket may then carry a feeler member 25a which is mounted on two parallel vertical leaf springs 74 so that it is free to move horizontally but not otherwise. As the cylinder 15 and the parts carried thereby are rotated, the feeler member 25a enters the serration being measured and the leaf springs 74 keep it in contact with both flanks of the serration. In this case the setting standard can be a turbine blade having known errors of spacing, and allowance can be made for these errors when adjusting the lengths of the struts.

Figure 2:
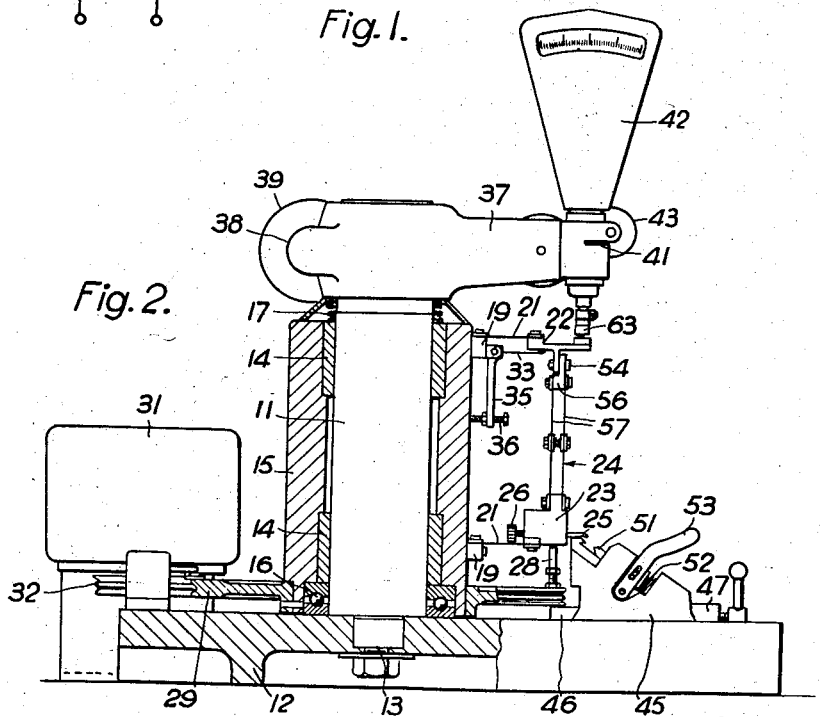
Fig. 2 is a vertical elevation partly in section on the centre line.

It will be understood that, with the workholder fixed, the apparatus above described, whether according to Figs. 1 to 3 or modified as in Figs. 6 and 7, only gauges a single point along the length of each serration. Gauging at a series of points can be effected by changing the position of the workholder in the inverted V slide.

Figure 8:
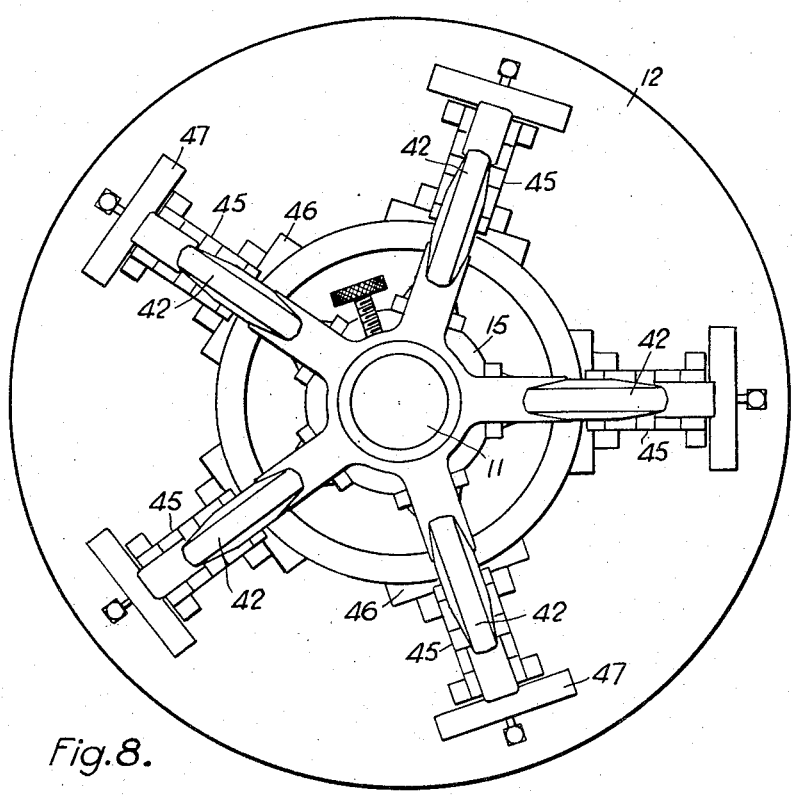
Fig. 8 is a diagrammatic plan view of a further development.

The apparatus above described gauges one workpiece only for each revolution of the turret. By providing additional stations each with a workholder with clamping means and an indicator, additional workpieces can be gauged per revolution. If the turret is rotated steadily these additional stations can be spaced at any convenient angular intervals, but if a control to speed up the movement between successive engagements of the feeler members with a workpiece is used, the stations should be at intervals which are equal to the intervals between successive feeler members or are an integral multiple thereof. Fig. 8 shows a machine in which the maximum number of stations each comprising a workholder 45 and indicator 42 has been provided.

What I claim is:

1. Apparatus for gauging a plurality of linear dimensions of a workpiece comprising a plurality of feeler members, one for each dimension to be gauged, means to effect relative movement between the feeler members and the workpiece, whereby each feeler member is carried in turn into engagement with the workpiece, support means for each feeler member, said support means allowing movement of the feeler member in the direction of the dimension being gauged, indicator means and coupling means operable to couple each of said feeler members in turn with said indicator means, said coupling means including a strut and means to effect bowing of said strut, whereby the length of said coupling means may be adjusted.

2. Apparatus for gauging a plurality of linear dimensions of a workpiece comprising a plurality of feeler members, one for each dimension to be gauged, means to effect relative movement between the feeler members and the workpiece, whereby each feeler member is carried in turn into engagement with the workpiece, support means for each feeler member, said support means allowing movement of the feeler member in the direction of the dimension being gauged and a plurality of coupling means each operable to couple one of said feeler members with said indicator means, each said coupling means including a strut and means to effect bowing of said strut, whereby the length of said coupling means may be adjusted.

3. Apparatus for gauging a plurality of linear dimensions of a workpiece comprising a plurality of feeler members, one for each dimension to be gauged, support means for each feeler member, said support means allowing movement of the feeler member in the direction of the dimension being gauged, an indicator, a plurality of coupling means each operable to couple one of said feeler members with said indicator and means to move said feeler members, said support means and said coupling means in a closed path, whereby each feeler member is carried in turn into engagement with the workpiece and simultaneously is coupled with said indicator, each said coupling means including a strut and means to effect bowing of said strut, whereby the length of said coupling means may be adjusted.

4. Apparatus as claimed in claim 3 in which said closed path is circular.

5. Apparatus as claimed in claim 3 in which each said support means include parallel spring strips allowing movement of the feeler member in the direction of the dimension being gauged.

6. Apparatus for gauging a plurality of linear dimensions of a workpiece comprising a plurality of feeler members, one for each dimension to be gauged, support means for each feeler member, each said support means comprising spring strips allowing movement of the feeler member in the direction of the dimension being gauged, an indicator, a plurality of coupling means each operable to couple one of said feeler members with said indicator and means to move said feeler members, said support means and said coupling means in a closed path, whereby each feeler member is carried in turn into engagement with the workpiece and simultaneously is coupled with said indicator, each said coupling means incorporating a strut comprising two thin strips and means to effect bowing of said strips, whereby the length of the strut is made adjustable.

7. Apparatus for gauging a plurality of linear dimentions of a workpiece comprising a plurality of feeler members, one for each dimension to be gauged, support means for each feeler member, said support means allowing movement of the feeler member in the direction of the dimension being gauged, an indicator, a plurality of coupling means each operable to couple one of said feeler members with said indicator and means to move said feeler members, said support means and said coupling means in a closed path, whereby each feeler member is carried in turn into engagement with the workpiece and simultaneously is coupled with said indicator, each said coupling means including a strut and means to effect bowing of said strut, whereby the length of said coupling means may be adjusted and each feeler member having an extremity shaped to lead said feeler member on to the workpiece.

8. Apparatus for gauging a plurality of linear dimensions of a workpiece comprising a plurality of feeler members, one for each dimension to be gauged, support means for each feeler member, said support means allowing movement of the feeler member in the direction of the dimension being gauged, an indicator, a plurality of coupling means each operable to couple one of said feeler members with said indicator, means to move said feeler members, said support means and said coupling means in a closed path, whereby each feeler member is carried in turn into engagement with the workpiece and simultaneously is coupled with said indicator and stop means limiting movement of said feeler members in the direction of the dimension being gauged when said feeler members are not in engagement with the workpiece, each said coupling means including a strut and means to effect bowing of said strut, whereby the length of said coupling means may be adjusted.

9. Apparatus for gauging a plurality of linear dimensions of a workpiece comprising a plurality of feeler members, one for each dimension to be gauged, support means for each feeler member, said support means allowing movement of the feeler member in the direction of the dimension being gauged, an indicator, a plurality of coupling means each operable to couple one of said feeler members with said indicator, driving means to move said feeler members, said support means and said coupling means in a circular path, whereby each feeler member is carried in turn into engagement with the workpiece and simultaneously is coupled with said indicator and means for varying the speed in said circular path so that the feeler members move rapidly when between positions in which a feeler member is in engagement with the workpiece and move more slowly when a feeler member is in engagement with the workpiece.

10. Apparatus for gauging a plurality of linear dimensions of a workpiece comprising a plurality of feeler members, one for each dimension to be gauged, support means for each feeler member, said support means allowing movement of the feeler member in the direction of the dimension being gauged, an indicator, a plurality of coupling means each operable to couple one of said feeler members with said indicator, driving means to move said feeler members, said support means and said coupling means in a circular path, whereby each feeler member is carried in turn into engagement with the workpiece and simultaneously is coupled with said indicator and means for varying the speed in said circular path so that the feeler members move rapidly when between positions in which a feeler member is in engagement with the workpiece and move more slowly when a feeler member is in engagement with the workpiece, each said coupling means including a strut and means to effect bowing of said strut, whereby the length of said coupling means may be adjusted.

11. Apparatus for gauging a plurality of linear dimensions of a workpiece comprising a base-plate, a pillar mounted of said base-plate and perpendicular thereto, a cylinder rotatable around said pillar, means for rotating said cylinder, a plurality of feeler members rotatable therewith, support means for each of said feeler members allowing movement of said feeler member in a direction perpendicular to said base-plate, workpiece holding means mounted on said base-plate in such a position that a workpiece in said holding means lies in the paths of said feeler members, an arm adjustably mounted on said pillar above said cylinder and extending from said pillar over said workpiece holding means, an indicator carried by said arm and a plurality of coupling means each attached to one of said feeler members and operable to couple said feeler member to the indicator when said feeler member is in the gauging position, each said coupling means including a strut and means to effect bowing of said strut whereby the length of said coupling means may be adjusted.

12. Apparatus for gauging a plurality of linear dimensions of a workpiece comprising a base-plate, a pillar mounted on said base-plate and perpendicular thereto, a cylinder rotatable around said pillar, a plurality of feeler members rotatable therewith, support means for each of said feeler members allowing movement of said feeler member in a direction perpendicular to said base-plate, workpiece holding means mounted on said base-plate in such a position that a workpiece in said holding means lies in the paths of said feeler members, an arm adjustably mounted on said pillar above said cylinder and extending from said pillar over said workpiece holding means, an indicator carried by said arm, a plurality of coupling means each attached to one of said feeler members and operable to couple said feeler member to the indicator when said feeler member is in the gauging position, means for rotating said cylinder and means for varying the speed of rotation so that the feeler members move rapidly between gauging positions and move more slowly at the gauging positions.

13. Apparatus for gauging a plurality of linear dimensions of a workpiece comprising a base-plate, a pillar mounted on said base-plate and perpendicular thereto, a cylinder rotatable around said pillar, a plurality of feeler members rotatable therewith, support means for each of said feeler members allowing movement of said feeler member in a direction perpendicular to said base-plate, workpiece holding means mounted on said base-plate in such a position that a workpiece in said holding means lies in the paths of said feeler members, an arm adjustably mounted on said pillar above said cylinder and extending from said pillar over said workpiece holding means, an indicator carried by said arm, a plurality of coupling means each attached to one of said feeler members and operable to couple said feeler member to the indicator when said feeler member is in the gauging position, means for rotating said cylinder and means for varying the speed of rotation so that the feeler members move rapidly between gauging positions and move more slowly at the gauging positions, each said coupling means including a strut and means to effect bowing of said strut, whereby the length of said coupling means may be adjusted.

14. Apparatus for gauging the pitch of blade root serrations comprising a base-plate, a pillar mounted perpendicularly on said base-plate, a cylinder rotatable around said pillar, driving means for rotating said cylinder, a plurality of feeler members spaced circumferentially around said cylinder and rotatable therewith, support means for each of said feeler members allowing movement of said feeler member in a vertical direction, blade-holding means mounted on said base-plate in such a position that the root serrations of a blade in said blade-holding means lie in the paths of said feeler members, an arm adjustably mounted on said pillar above said cylinder and extending from said pillar over said workpiece holding means, an indicator carried by said arm and a plurality of coupling means each attached to one of said feeler members and operable to couple said feeler member to the indicator when said feeler member is in the gauging position, each said coupling means including a strut and means to effect bowing of said strut whereby the length of said coupling means may be adjusted.

15. Apparatus as claimed in claim 14 in which the blade-holding means comprises a first anvil attached to said base-plate and adapted to enter a serration on one side of the blade-root being inspected, a second anvil slidable towards and away from said first anvil and adapted to enter a serration on the other side of the blade-root being inspected and clamping means to hold the slidable anvil in a position in which the blade-root is gripped between the two anvils.

16. Apparatus as claimed in claim 15 in which the anvils are mounted obliquely to the base-plate so that a flank of each of the serrations being inspected is substantially parallel with said base-plate.

17. Apparatus for gauging the pitch of blade-root serrations comprising a base-plate, a pillar mounted perpendicularly on said base-plate, a cylinder rotatable around said pillar, driving means for rotating said cylinder, a plurality of feeler members spaced circumferentially around said cylinder and rotatable therewith, support means for each of said feeler members allowing movement of said feeler member in a vertical direction, blade-holding means mounted on said base-plate in such a position that the root serrations of a blade in said blade-holding means lie in the paths of said feeler members, an arm adjustably mounted on said pillar above said cylinder and extending from said pillar over said workpiece holding means, an indicator carried by said arm and a plurality of coupling means each attached to one of said feeler members and operable to couple said feeler member to the indicator when said feeler is in the gauging position.

18. Apparatus for gauging the pitch of blade root serrations comprising a base-plate, a pillar mounted perpendicularly on said base-plate, a cylinder rotatable around said pillar, driving means for rotating said cylinder, a plurality of feeler members spaced circumferentially around said cylinder and rotatable therewith, support means for each of said feeler members allowing movement of said feeler member in a vertical direction, blade-holding means mounted on said base-plate in such a position that the root serrations of a blade in said blade-holding means lie in the paths of said feeler members, an arm adjustably mounted on said pillar above said cylinder and extending from said pillar over said workpiece holding means, an indicator carried by said arm, a plurality of coupling means each attached to one of said feeler members and operable to couple said feeler member to the indicator when said feeler is in the gauging position and means for varying the speed of rotation of said cylinder so that the feeler members move rapidly between gauging positions and move more slowly at said gauging positions.

References Cited in the file of this patent

UNITED STATES PATENTS

| | | |
|---|---|---|
| 2,177,399 | Aller | Oct. 24, 1939 |
| 2,307,831 | Emery | Jan. 12, 1943 |
| 2,372,879 | Bjorklund et al. | Apr. 3, 1945 |

FOREIGN PATENTS

| | | |
|---|---|---|
| 369,503 | Germany | Feb. 20, 1923 |
| 730,285 | Great Britain | May 18, 1955 |